(12) United States Patent
Pei

(10) Patent No.: US 9,157,575 B2
(45) Date of Patent: Oct. 13, 2015

(54) RATCHET-GOVERNED TELEVISION STAND

(71) Applicant: Xubo Pei, Shenzhen (CN)

(72) Inventor: Xubo Pei, Shenzhen (CN)

( * ) Notice: Subject to any disclaimer, the term of this patent is extended or adjusted under 35 U.S.C. 154(b) by 0 days.

(21) Appl. No.: 14/112,719

(22) PCT Filed: Jun. 18, 2013

(86) PCT No.: PCT/CN2013/077395
§ 371 (c)(1),
(2) Date: Oct. 18, 2013

(87) PCT Pub. No.: WO2014/186995
PCT Pub. Date: Nov. 27, 2014

(65) Prior Publication Data
US 2014/0346297 A1 Nov. 27, 2014

(51) Int. Cl.
*E04G 3/00* (2006.01)
*F16M 13/02* (2006.01)
*F16M 11/10* (2006.01)

(52) U.S. Cl.
CPC ............. *F16M 13/022* (2013.01); *F16M 11/10* (2013.01); *F16M 13/02* (2013.01); *F16M 2200/024* (2013.01)

(58) Field of Classification Search
CPC ...... F16M 11/10; F16M 13/02; F16M 13/022
USPC ............ 248/292.12, 354.7, 223.31, 917, 923, 248/919, 922, 293; 403/105
See application file for complete search history.

(56) References Cited

U.S. PATENT DOCUMENTS

| | | | | |
|---|---|---|---|---|
| 2,430,495 | A * | 11/1947 | Dath | 188/82.3 |
| 6,354,552 | B1 * | 3/2002 | Chiu | 248/422 |
| 6,491,268 | B1 * | 12/2002 | Channer et al. | 248/176.1 |
| 7,523,907 | B2 * | 4/2009 | Chen | 248/292.12 |
| 7,663,868 | B1 * | 2/2010 | Lam | 361/679.06 |
| 8,052,208 | B2 * | 11/2011 | Kim et al. | 297/146 |
| 8,070,121 | B2 * | 12/2011 | Dozier et al. | 248/294.1 |

(Continued)

FOREIGN PATENT DOCUMENTS

| | | |
|---|---|---|
| CN | 1585595 | 2/2005 |
| CN | 201218397 | 4/2009 |

(Continued)

*Primary Examiner* — Jonathan Liu
*Assistant Examiner* — Muhammad Ijaz
(74) *Attorney, Agent, or Firm* — Novoclaims Patent Services LLC; Mei Lin Wong

(57) ABSTRACT

A ratchet-governed television stand mainly consists of a wall panel (1), a left rack (2) and a right rack (3). The left rack (2) is hooked on a left side of the wall panel (1) and is fastened with a screw, the right rack (3) is hooked on a right side of the wall panel (1) and is fastened with a screw, the whole bracket is mounted on a surface of a support such as a wall through the wall panel (1), and a flat-panel television is mounted on the left rack (2) and the right rack (3), to achieve a visual angle required by people. The wall panel (1) is of a cuboid structure, an upper rail (11) is formed at an upper edge of the wall panel (1), a lower rail (12) is formed at a lower edge, the left rack (2) mainly includes a hook (21), a support rod (22) and a ratchet connector (23), a lower end of the support rod (22) is movably connected with a lower end of the hook (21) through a threaded rod, an upper end of the support rod (22) is movably connected with an upper end of the hook (21) through the ratchet connector (23), and the right rack (3) has a structure consistent with that of the left rack (2), to achieve the objective of design.

12 Claims, 2 Drawing Sheets

(56) References Cited

U.S. PATENT DOCUMENTS

| | | | |
|---|---|---|---|
| 8,262,044 B2* | 9/2012 | Luijben et al. | 248/276.1 |
| 8,746,642 B2* | 6/2014 | Molter | 248/299.1 |
| 2001/0050327 A1* | 12/2001 | Sweere et al. | 248/292.14 |
| 2002/0033436 A1* | 3/2002 | Peng et al. | 248/284.1 |
| 2003/0001057 A1 | 1/2003 | Sweere et al. | |
| 2006/0145038 A1* | 7/2006 | Chen | 248/292.12 |
| 2006/0291152 A1* | 12/2006 | Bremmon | 361/681 |
| 2007/0007413 A1* | 1/2007 | Jung et al. | 248/284.1 |
| 2007/0205345 A1* | 9/2007 | Chen | 248/297.31 |
| 2007/0262215 A1* | 11/2007 | Tan | 248/201 |
| 2008/0011927 A1* | 1/2008 | Park | 248/324 |
| 2008/0315049 A1* | 12/2008 | Bailo et al. | 248/176.1 |
| 2010/0207006 A1* | 8/2010 | Kim | 248/625 |

FOREIGN PATENT DOCUMENTS

| | | |
|---|---|---|
| CN | 101716063 | 6/2010 |
| CN | 202756866 | 2/2013 |
| GB | 2435296 | 8/2007 |

\* cited by examiner

RATCHET-GOVERNED TELEVISION STAND

BACKGROUND

1. Technical Field

The present invention relates to a television stand, and in particular, to a ratchet-governed television stand capable of automatically locking a fixing position.

2. Related Art

With the continuous progress of science and technology, people's living standards continue to rise, audio-visual industries have been rapidly developed, the flat-panel television has been a great welcome due to advantages of small size and light weight, which is mostly mounted on a fixed bracket when it is placed, but the imaging technology of the flat-panel television is different from that of the ordinary tube television, and when people watch the program, they need to face the television squarely so as to achieve a very good visual effect, especially for an LCD television; thus, the television stand capable of rotating a certain angle is welcomed by consumers, but the current television stands mostly rotate a certain angle to meet the viewing angle, and then the angle position needs to be manually fixed, when a different angle is needed, the manual fixing operation is required again, the use and operation is quite troublesome, and some even need the help of some professional operation; so, a simple and convenient television stand capable of automatically locking the fixing position is in urgent need, so as to meet people's demands.

SUMMARY

An objective of the present invention is to develop a ratchet-governed television stand capable of automatically locking a fixing position, which has a simple structure, is easy to operate and conveniently applicable, and has reliable performance, so as to solve the above problems.

The present invention is implemented through the following technical solution.

The present invention mainly consists of a wall panel, a left rack and a right rack. The left rack is hooked on a left side of the wall panel and is fastened with a screw, the right rack is hooked on a right side of the wall panel and is fastened with a screw, the whole bracket is mounted on a surface of a support such as a wall through the wall panel, a flat-panel television is mounted on the left rack and the right rack; when the screw is adjusted, the left rack and the right rack can move horizontally left and right along the wall panel within a certain range; when the left rack and the right rack are adjusted, the left rack and the right rack can rotate downwards within a certain range, to achieve a visual angle required by people, where the wall panel is of a cuboid structure, an upper rail is formed at an upper edge of the wall panel, a lower rail is formed at a lower edge, the left rack mainly includes a hook, a support rod and a ratchet connector, a lower end of the support rod is movably connected with a lower end of the hook through a threaded rod, an upper end of the support rod is movably connected with an upper end of the hook through the ratchet connector, and the right rack has a structure consistent with that of the left rack.

The ratchet connector mainly includes a ratchet governing device, a left connecting piece and a right connecting piece, the left connecting piece and the right connecting piece are disposed at a left side and a right side of the ratchet governing device, a lower end of the ratchet governing device is movably connected with a lower end of the left connecting piece and a lower end of the right connecting piece through a threaded rod, an upper end of the ratchet governing device is movably connected with the upper end of the hook, an upper end of the left connecting piece, an upper end of the right connecting piece and the upper end of the support rod are movably connected, a positioning fixed column is disposed between the left connecting piece and the right connecting piece, the ratchet governing device, the left connecting piece and the right connecting piece can achieve relative rotation around the threaded rod, so that the support rod can realize rotation by a certain angle relative to the hook, and the maximum rotation angle may be up to 15 degrees, where the left connecting piece forms a front stop column and a rear stop column, the left connecting piece is provided with a multi-stage limiting stop column hole, and a stop column with a smaller rotation angle can be set according to a specific condition of the television.

The ratchet governing device mainly includes a housing, a ratchet, a shifting lever, a ratchet pawl, a return spring and a ratchet cover, the ratchet, the ratchet pawl and the return spring are disposed in an inner cavity of the housing, the return spring is disposed between an inner cavity wall of the housing and the ratchet pawl, the shifting lever is L-shaped, one end forms a shifting lever end, the other end forms a handle end, the shifting lever end forms a notch structure, the shifting lever end of the shifting lever passes through a wall of the housing to be inserted between the ratchet pawl and the ratchet, the handle end of the shifting lever is exposed at the left side of the housing, and the ratchet cover is fastened on the right side of the housing through a screw, to achieve packaging; the shifting lever can rotate to form two position states: a middle position and a front position, so as to achieve separation and combination states of the ratchet pawl and the ratchet.

In use, the present invention is fixed on a surface of a fixture such as a wall through a screw, the flat-panel television is fixed on the left rack and the right rack through a bolt; when an operator manually pushes the television to move toward a direction parallel to the surface of the fixture such as the wall, the front stop column of the left connecting piece drives the handle end of the shifting lever to move backwards; when the shifting lever reaches the middle position, the shifting lever end of the shifting lever lifts up the ratchet pawl, the ratchet pawl and the ratchet are completely separated from each other; at this time, when the operator releases the television, the support rod is driven to incline forward due to the weight of the television; at the moment, the left connecting piece, the right connecting piece and the ratchet governing device make relative movement, the rear stop column of the left connecting piece drives the handle end of the shifting lever to move forward, and when the shifting lever reaches the front position, the ratchet pawl and the ratchet are completely meshed with each other and cannot rotate, so as to reach the front limit and reach the maximum inclination angel of 15 degrees; when it is required to adjust the television to an appropriate position, the television is pushed manually once again, the television only can move unidirectionally due to meshing of the ratchet pawl and the ratchet, and when the television reaches the appropriate position, the external force is released, and as the meshing of the ratchet pawl and the ratchet plays a role of fixing the position, no external device is required to fix the position, and it is feasible that the television is pushed again when it is required to adjust the angle; when the television is parallel to the surface of the fixture such as the wall, the shifting lever reaches the middle position, the shifting lever end of the shifting lever lifts up the ratchet pawl, the ratchet pawl and the ratchet are completely separated from each other, and at this time, when the operator releases the television, the support rod is driven to incline to the maximum angle due to the weight of the television, and if the operations are repeated, the multi-angle viewing needs can be met, to achieve the objective of design.

When the plat-panel television is thick and rotates to an angle of 15 degrees, it may collide with the surface of the fixture such as the wall, and in this case, a stop column may be disposed in the multi-stage limiting stop column hole in the left connecting piece, so as to reduce the rotation angle, to prevent the plat-panel television from colliding with the surface of the fixture such as the wall, thereby achieving the objective of design.

The present invention has the following advantages.

1. With the implementation of the present invention, the device has a simple structure, is easy to operate and conveniently applicable, has reliable performance, achieves large-range angle adjustment, and can automatically lock the fixing position.

BRIEF DESCRIPTION OF THE DRAWINGS

The present invention is further described below with reference to the accompanying drawings.

In the figures, 1 Wall panel, 11 Upper rail, 12 Lower rail, 2 Left rack, 21 Hook, Support rod, 23 Ratchet connector, 24 Ratchet governing device, 25 Left connecting piece, 26 Right connecting piece, 27 Positioning fixed column, 28 Front stop column, 29 Rear stop column, 210 Limiting stop column hole, 211 Housing, 212 Ratchet, 213 Shifting lever, 214 Ratchet pawl, 215 Return spring, 216 Ratchet cover, 217 Shifting lever end, 218 Handle end, 219 Notch structure, 3 Right rack.

DETAILED DESCRIPTION

Figure 1:
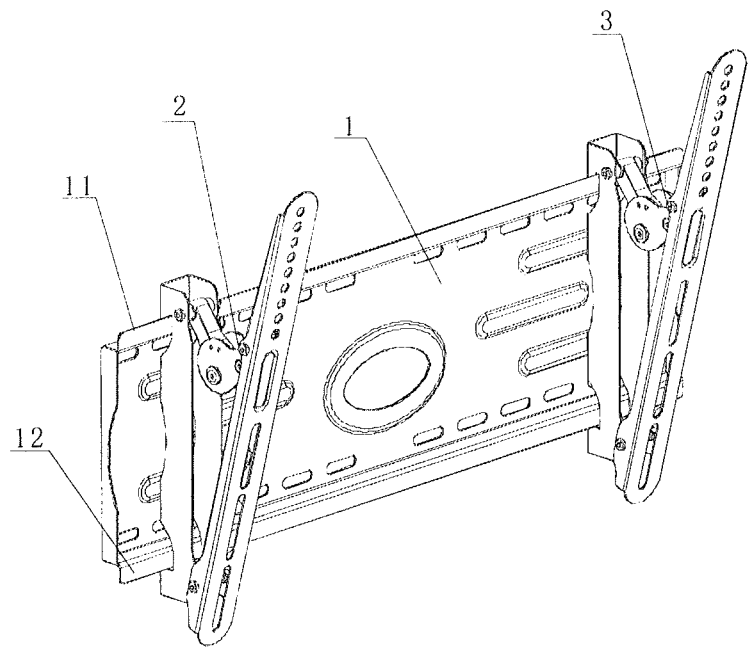
FIG. 1 is a schematic structural view of the present invention.
Figure 2:
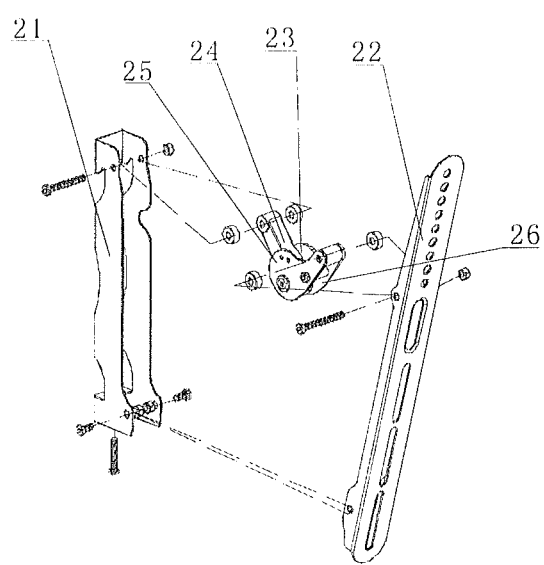
FIG. 2 is a schematic view of assembling of a left rack according to the present invention.
Figure 3:
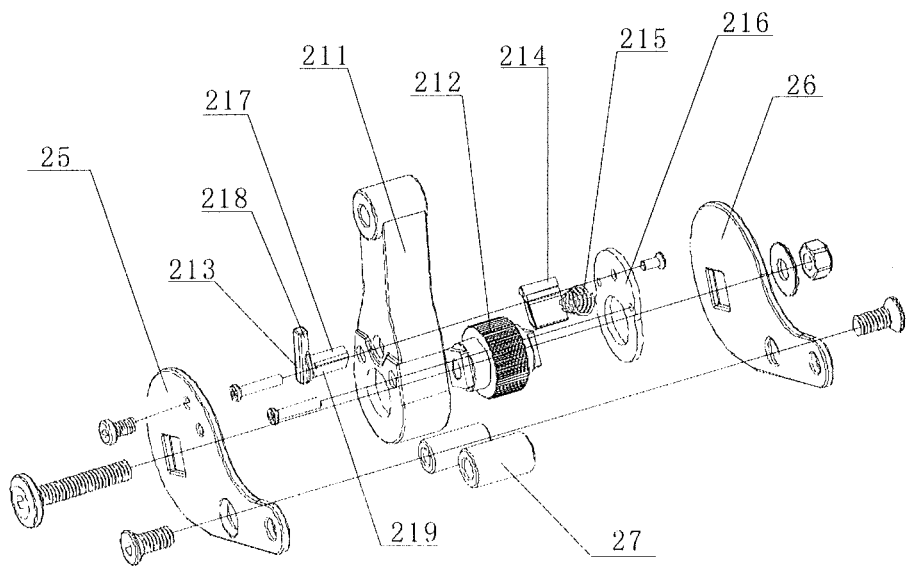
FIG. 3 is a schematic view of assembling of a ratchet connector of the left rack according to the present invention.
Figure 4:
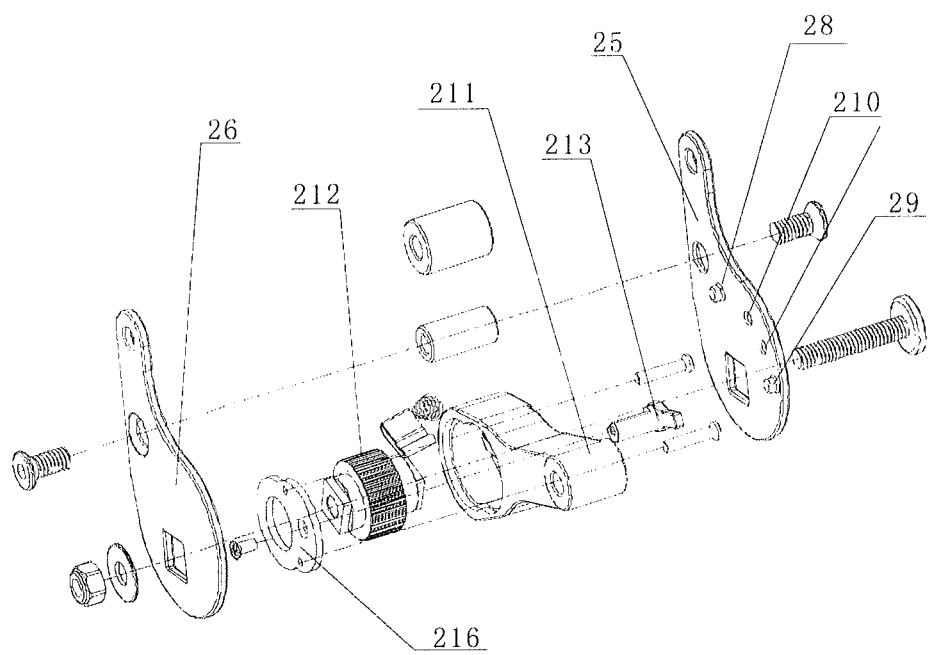
FIG. 4 is a schematic view of assembling, viewed from another angle, of the ratchet connector of the left rack according to the present invention.

FIG. 1 to FIG. 4 show that the present invention mainly consists of a wall panel 1, a left rack 2 and a right rack 3. The left rack 2 is hooked on a left side of the wall panel 1 and is fastened with a screw, the right rack 3 is hooked on a right side of the wall panel 1 and is fastened with a screw, the whole bracket is mounted on a surface of a support such as a wall through the wall panel 1, a flat-panel television is mounted on the left rack 2 and the right rack 3; when the screws are adjusted, the left rack 2 and the right rack 3 can move horizontally left and right along the wall panel 1 within a certain range; when the left rack 2 and the right rack 3 are adjusted, the left rack 2 and the right rack 3 can rotate downwards within a certain range, to achieve a visual angle required by people, where the wall panel 1 is of a cuboid structure, an upper rail 11 is formed at an upper edge of the wall panel 1, a lower rail 12 is formed at a lower edge, the left rack 2 mainly includes a hook 21, a support rod 22 and a ratchet connector 23, a lower end of the support rod 22 is movably connected with a lower end of the hook 21 through a threaded rod, an upper end of the support rod 22 is movably connected with an upper end of the hook 21 through the ratchet connector 23, and the right rack 3 has a structure consistent with that of the left rack 2.

The ratchet connector 23 mainly includes a ratchet governing device 24, a left connecting piece 25 and a right connecting piece 26, the left connecting piece 25 and the right connecting piece 26 are disposed at a left side and a right side of the ratchet governing device 24, a lower end of the ratchet governing device 24 is movably connected with a lower end of the left connecting piece 25 and a lower end of the right connecting piece 26 through a threaded rod, an upper end of the ratchet governing device 24 is movably connected with the upper end of the hook 21, an upper end of the left connecting piece 25, an upper end of the right connecting piece 26 and the upper end of the support rod 22 are movably connected, a positioning fixed column 27 is disposed between the left connecting piece 25 and the right connecting piece 26, the ratchet governing device 24, the left connecting piece 25 and the right connecting piece 26 can achieve relative rotation around the threaded rod, so that the support rod 22 can realize rotation by a certain angle relative to the hook 21, and the maximum rotation angle may be up to 15 degrees, where the left connecting piece 25 forms a front stop column 28 and a rear stop column 29, the left connecting piece 25 is provided with a multi-stage limiting stop column hole 210, and a stop column with a smaller rotation angle can be set according to a specific condition of the television.

The ratchet governing device 24 mainly includes a housing 211, a ratchet 212, a shifting lever 213, a ratchet pawl 214, a return spring 215 and a ratchet cover 216, the ratchet 212, the ratchet pawl 214 and the return spring 215 are disposed in an inner cavity of the housing 211, the return spring 215 is disposed between an inner cavity wall of the housing 211 and the ratchet pawl 214, the shifting lever 213 is L-shaped, one end forms a shifting lever end 217, the other end forms a handle end 218, the shifting lever end 217 forms a notch structure 219, the shifting lever end 217 of the shifting lever 213 passes through a wall of the housing 211 to be inserted between the ratchet pawl 214 and the ratchet 212, the handle end 218 of the shifting lever 213 is exposed at the left side of the housing 211, and the ratchet cover 216 is fastened on the right side of the housing 211 through a screw, to achieve packaging; the shifting lever 213 can rotate to form two position states: a middle position and a front position, so as to achieve separation and combination states of the ratchet pawl and the ratchet.

In use, the present invention is fixed on a surface of a fixture such as a wall through a screw, the flat-panel television is fixed on the left rack 2 and the right rack 3 through a bolt; when an operator manually pushes the television to move toward a direction parallel to the surface of the fixture such as the wall, the front stop column of the left connecting piece drives the handle end of the shifting lever to move backwards; when the shifting lever reaches the middle position, the shifting lever end of the shifting lever lifts up the ratchet pawl, the ratchet pawl and the ratchet are completely separated from each other; at this time, when the operator releases the television, the support rod is driven to incline forward due to the weight of the television; at the moment, the left connecting piece, the right connecting piece and the ratchet governing device make relative movement, the rear stop column of the left connecting piece drives the handle end of the shifting lever to move forward, and when the shifting lever reaches the front position, the ratchet pawl and the ratchet are completely meshed with each other and cannot rotate, so as to reach the front limit and reach the maximum inclination angel of 15 degrees; when it is required to adjust the television to an appropriate position, the television is pushed manually once again, the television only can move unidirectionally due to meshing of the ratchet pawl and the ratchet, and when the television reaches the appropriate position, the external force is released, and as the meshing of the ratchet pawl and the ratchet plays a role of fixing the position, no external device is required to fix the position, and it is feasible that the television is pushed again when it is required to adjust the angle; when the television is parallel to the surface of the fixture such as the wall, the shifting lever reaches the middle position again, the shifting lever end of the shifting lever lifts up the ratchet pawl, the ratchet pawl and the ratchet are completely separated from each other, and at this time, when the operator releases the television, the support rod is driven to incline to the maximum angle due to the weight of the television, and if the operations are repeated, the multi-angle viewing needs can be met, to achieve the objective of design.

When the plat-panel television is thick and rotates to an angle of 15 degrees, it may collide with the surface of the fixture such as the wall, and in this case, a stop column may be disposed in the multi-stage limiting stop column hole in the left connecting piece, so as to reduce the rotation angle, to prevent the plat-panel television from colliding with the surface of the fixture such as the wall, thereby achieving the objective of design.

Only preferred embodiments of the present invention are disclosed above, which cannot be used to limit the scope of the claims of the present invention, and thus equivalent variations made according to the patent scope of the present invention still fall into the scope of the present invention.

The present invention has a simple structure, is easy to operate and conveniently applicable, has reliable performance, achieves large-range angle adjustment, can automatically lock the fixing position, and is widely applied to the field of ratchet-governed television stand.

What is claimed is:

1. A television stand, comprising:
    a wall panel; and
    at least one rack, which comprises:
        a hook having an upper end and a lower end, said hook securely connected to said wall panel;
        a support rod having an upper portion and a lower portion, said lower portion of said support rod being pivotally connected to said lower end of said hook; and
        a ratchet connector, comprising:
            a ratchet governing device which is connected to said hook and comprises a ratchet received in said ratchet governing device;
            a left connecting piece connected between said ratchet governing device and said support rod;
            a right connecting piece connected between said ratchet governing device and said support rod; and
            a shifting lever provided on said ratchet governing device to move between a middle position and a front position,
            wherein in said middle position, said shifting lever disengages from said ratchet so as to allow said left connecting piece and said right connecting piece to pivotally move in a direction away from said wall panel,
            wherein in said front position, said shifting lever is driven to engage with said ratchet so as to allow said left connecting piece and said right connecting piece to pivotally move in a direction toward said wall panel while securely locking said left connecting piece and said right connecting piece to move in a direction away from said wall panel;
        wherein said ratchet governing device further comprises a housing for receiving said ratchet, and a ratchet pawl received in said housing and connected to said shifting lever, said ratchet pawl being driven by said shifting lever to selectively engage with said ratchet;
        wherein said shifting lever has an L cross sectional shape, and defines a handle end extended out of said housing of said ratchet governing device, and a shifting lever end configured as having a notch structure and extended at a position between said ratchet pawl and said ratchet.

2. The television stand, as recited in claim 1, wherein said left connecting piece has a front stop column and a rear stop column spacedly formed on an inner surface thereof, said handle end of said shifting lever being extended at a position between said front stop column and said rear stop column so that when said left connecting piece is driven to pivotally moved toward said wall panel, said front stop column is arranged to drive said handle end of said shifting lever to move to said middle position for allowing said shifting lever end to drive said ratchet pawl to disengage from said ratchet.

3. The television stand, as recited in claim 2, wherein said rear stop column is extended from said left connecting piece at a position such that when said support rod pivotally moves away from said wall panel, said rear stop column is arranged to drive said handle end of said shifting lever to move to said front position so as to drive said ratchet pawl to engage with said ratchet.

4. The television stand, as recited in claim 3, wherein said ratchet governing device further comprises a return spring received in said housing and is connected to said ratchet pawl for normally retaining said ratchet pawl at said middle position.

5. The television stand, as recited in claim 4, wherein a lower end of said ratchet governing device is movably connected with a lower end of said left connecting piece and a lower end of said right connecting piece, while an upper end of said ratchet governing device is movably connected with an upper end of said hook.

6. The television stand, as recited in claim 4, wherein an upper end of said left connecting piece and an upper end of said right connecting piece are movably connected to said upper portion of said support rod.

7. The television stand, as recited in claim 4, wherein said rack is movably mounted on said wall panel in such a manner that said rack is capable of moving on said rack along a longitudinal direction thereof.

8. The television stand, as recited in claim 4, wherein said wall panel has an upper rail formed at an upper edge of said wall panel, and a lower rail formed at a lower edge of said wall panel, said rack being movably mounted on said upper rail and said lower rail.

9. The television stand, as recited in claim 1, wherein a lower end of said ratchet governing device is movably connected with a lower end of said left connecting piece and a lower end of said right connecting piece, while an upper end of said ratchet governing device is movably connected with said upper end of said hook.

10. The television stand, as recited in claim 1, wherein an upper end of said left connecting piece and an upper end of said right connecting piece are movably connected to said upper portion of said support rod.

11. The television stand, as recited in claim 1, wherein said rack is movably mounted on said wall panel in such a manner that said rack is capable of moving on said rack along a longitudinal direction thereof.

12. The television stand, as recited in claim 1, wherein said wall panel has an upper rail formed at an upper edge of said wall panel, and a lower rail formed at a lower edge of said wall panel, said rack being movably mounted on said upper rail and said lower rail.

* * * * *